United States Patent
Hirato et al.

(10) Patent No.: US 8,626,351 B2
(45) Date of Patent: Jan. 7, 2014

(54) METHOD AND DEVICE FOR OPERATION SCHEDULING FOR ENERGY STORAGE EQUIPMENT

(75) Inventors: Kota Hirato, Tokyo (JP); Yoshimasa Tada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 12/920,122

(22) PCT Filed: Feb. 25, 2009

(86) PCT No.: PCT/JP2009/000830
§ 371 (c)(1), (2), (4) Date: Dec. 30, 2010

(87) PCT Pub. No.: WO2009/107373
PCT Pub. Date: Sep. 3, 2009

(65) Prior Publication Data
US 2011/0087381 A1    Apr. 14, 2011

(30) Foreign Application Priority Data

Feb. 29, 2008    (JP) ................. 2008-051184

(51) Int. Cl.
G05B 13/02    (2006.01)
G05D 3/12    (2006.01)
F02B 43/00    (2006.01)
G01R 21/00    (2006.01)
G06E 1/00    (2006.01)
G01R 11/56    (2006.01)

(52) U.S. Cl.
USPC ............... 700/291; 700/28; 700/36; 700/48; 700/286; 60/39.12; 702/60; 706/19; 705/412

(58) Field of Classification Search
CPC ........................... G05B 13/024; Y04S 20/222
USPC .......... 700/28, 36, 48–50, 90, 286, 291, 295; 60/39.12, 39.13; 702/60, 61; 706/19, 706/21, 907; 705/412

See application file for complete search history.

(56) References Cited

U.S. PATENT DOCUMENTS 5,315,521 A    5/1994    Hanson et al.
5,432,710 A    7/1995    Ishimaru et al.
(Continued)

FOREIGN PATENT DOCUMENTS

CN    101330210 A    12/2008
EP    2 251 751 A1    11/2010
(Continued)

OTHER PUBLICATIONS

Marwali et al., Short Term Generation Scheduling in PhotoVoltaic Utility Grid With Battery Storage, IEEE, 1998.*

(Continued)

*Primary Examiner* — Kavita Padmanabhan
*Assistant Examiner* — Darrin Dunn
(74) *Attorney, Agent, or Firm* — Oblon, Spivak, McClelland, Maier & Neustadt, L.L.P.

(57) ABSTRACT

In various energy systems which handle a plurality of types of energy, a method and device for operation scheduling for energy storage equipment are provided, which determines optimal operation of an energy storage equipment and improves the efficiency of the energy system overall. An energy storage equipment operation scheduling part 13 creates an energy storage equipment operation schedule, an energy generation equipment modified operation schedule, and an energy storage equipment modified operation schedule, based on three information items, which are the energy demand forecast information stored in a storage part D1, the energy generation equipment operation schedule stored in a storage part D2, and equipment connection information, and sends the created schedules to the equipment controller 20.

3 Claims, 7 Drawing Sheets

(56) References Cited

U.S. PATENT DOCUMENTS

| | | | |
|---|---|---|---|
| 5,873,251 A | 2/1999 | Lino | |
| 7,991,512 B2* | 8/2011 | Chandra et al. | 700/291 |
| 2003/0189420 A1* | 10/2003 | Hashimoto et al. | 323/212 |
| 2004/0039490 A1* | 2/2004 | Kojima et al. | 700/287 |
| 2007/0276547 A1* | 11/2007 | Miller | 700/295 |
| 2009/0319090 A1* | 12/2009 | Dillon et al. | 700/291 |
| 2011/0270457 A1* | 11/2011 | Kreiss et al. | 700/292 |

FOREIGN PATENT DOCUMENTS

| | | |
|---|---|---|
| JP | 6086463 | 3/1994 |
| JP | 6182192 | 7/1994 |
| JP | 7328412 | 12/1995 |
| JP | 9179604 | 7/1997 |
| JP | 2004 171548 | 6/2004 |
| JP | 2005 102357 | 4/2005 |
| JP | 2005 257097 | 9/2005 |

OTHER PUBLICATIONS

Lee, Operating Schedule of Battery Energy Storage System in a Time-of-Use Rate Industrial User With Wind Turbine Generators: A Multipass Iteration Particle Swarm Optimization Approach, IEEE, 2007.*

Office Action issued Dec. 11, 2012 in Chinese Patent Application No. 200980106649.9 (with English translation).

Iwanami Kouza: Ouyou Suugaku 15 (Houhou 7), Saitekika Hou (Hiroshi Fujita, Hiroshi Konno, Kunio Tanabe) pp. 96-98 (1998).

Clear Report/Search Report mailed Sep. 13, 2013 in Malaysian Patent Application No. PI2010004015.

* cited by examiner

METHOD AND DEVICE FOR OPERATION SCHEDULING FOR ENERGY STORAGE EQUIPMENT

TECHNICAL FIELD

This invention relates to a method and device for operation scheduling for energy storage equipment in an energy system having various energy forms.

BACKGROUND ART

In recent years, there has been an increasing number of energy systems which simultaneously handle various energy forms, from the standpoint of global environmental protection and energy conservation.

For example, a so-called cogeneration system, in which waste heat is recovered from electric power facilities at the time of electric power generation and is converted into heat conforming to the form of utilization and supplied together with electric power, aims to achieve extremely high total efficiency, nearly double the efficiency when only the generated electric power is used.

Figure 7:
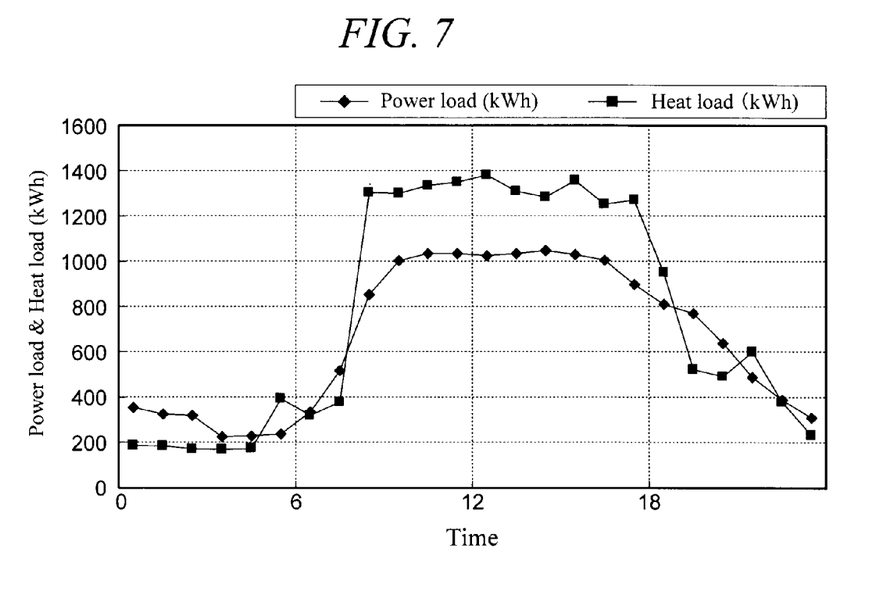
FIG. 7 shows an example of changes in one day of an electric power load and a heat load; and, FIG. 8 shows an example of electric power output and quantity of recovered heat, versus load factor of a power-heat generation equipment.
Figure 8:
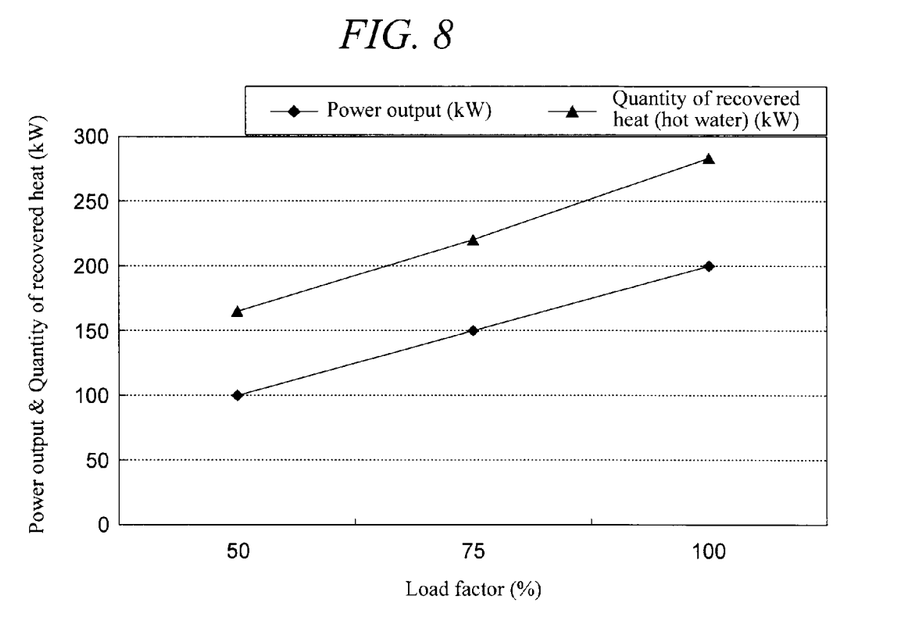

FIG. 7 is a graph showing the change with time in electric power demand and heat demand in one day in a certain region; the horizontal axis represents time, and the vertical axis represents the electric power load and heat load. As is clear from FIG. 7, in general heat is supplied simultaneously with electric power, and so in essence the coincidence, in terms of both quantity and time, of electric power demand state and the heat demand state is a condition to achieve high total efficiency in a cogeneration system.

However, in actuality the electric power demand state and the heat demand state do not necessarily coincide, and so when supply of either electric power or of heat is matched to demand, the problem occurs that the total efficiency which initially had been expected is not obtained. Hence a measure is conceivable in which, by introducing an electricity storage equipment or a heat storage equipment, high total efficiency is secured.

In a system in which an electricity storage equipment or a heat storage equipment, or both, is introduced, when considering operation during a certain term, questions include the timing with which power charge or heat charge by a electricity storage equipment or heat storage equipment is rational, and the timing with which power discharge or heat discharge from an electricity storage equipment or heat storage equipment is rational. When considering operation of an electricity storage equipment or heat storage equipment during a certain term, due to constraints on the capacity of the electricity storage equipment or heat storage equipment, unconditional continuation of power discharge or of heat discharge is not possible, and the need arises to perform power charge or heat charge in a certain time period equal to the amount of reduction in charged power or charged heat due to power discharge or heat discharge in a different time period, to restore the amount of power charge or heat charge. Further, it is expected that, instead of considering these equipments independently, simultaneous optimization will be more effective.

In methods of energy system operation scheduling of the prior art, for example in relation to electricity storage equipments, generally time periods for power charge at nighttime and time periods for power discharge during electric power load peaks are decided, and schedules for operation are created according to rules.

Among such energy system operation scheduling methods, there are some which suggest that mixed-integer programming problems can be directly applied (Patent Document 1). Further, as an alternative, a method has been proposed in which a metaheuristic method is applied and an approximate solution is found (Patent Document 2).

Patent Document 1: Japanese Patent Laid-open No. 2005-257097
Patent Document 2: Japanese Patent Laid-open No. 2004-171548
Non-patent Document 1: *Iwanami Kouza: Ouyou Suugaku* 15 (*Houhou* 7), *Saitekika Hou* (Hiroshi Fujita, Hiroshi Konno, Kunio Tanabe (1998))

Among energy system operation scheduling methods of the prior art for an energy system which simultaneously handles various forms of energy, a practical method for determining an operation schedule which simultaneously optimizes two or more types of energy storage equipments has not been established, and so it could not be said that operation was necessarily optimized, viewing the energy system as a whole.

For example, when applying a mixed-integer programming problem disclosed in Patent Document 1, problems that can be handled using current technology are limited to mixed-integer quadratic programming problems, so that the fuel consumption characteristics of equipment existing in the energy system are limited to simple characteristics represented by downward convex quadratic equations. Further, in general such mixed-integer quadratic programming problems are often not for practical purposes soluble, due to constraints on computation time.

Further, when applying a metaheuristic method disclosed in Patent Document 2, although in general a solution is obtained using a metaheuristic method in a practical amount of computation time, often ease of explanation is lacking, and there has been the problem that solution analysis is difficult.

DISCLOSURE OF THE INVENTION

This invention was devised in order to solve the above problems of the prior art, and has as an object the provision, in various energy systems which handle a plurality of types of energy, of a method and device for operation scheduling for energy storage equipment which determines optimal operation of an energy storage equipment and improves the efficiency of the energy system overall.

In one aspect of the invention, a method for operation scheduling for energy storage equipment is provided in an energy system which has an energy generation equipment group composed of a plurality of energy generation equipments and an energy storage equipment group composed of a plurality of energy storage equipments capable of both energy generation and storage. This method comprises the steps of: forecasting energy demand for the energy system overall in each time period included in a prescribed term; finding an operation schedule of the energy generation equipments such that an operation schedule for each time period is found which satisfy energy demand for a prescribed term in each of the energy generation equipments; changing the loads to be allocated to each of the energy generation equipments, by a given discrete quantity, either for a plurality of loads simultaneously or separately, and calculating the change in energy supply cost from this change of the loads; and, determining an operation schedule of the energy storage equipments, based on the forecasted energy demand and the found operation schedule, such that the sum of the energy supply costs of the energy generation equipments during the term is minimized.

In another aspect of this invention, a device is provided which comprehends the characteristics of this method in terms of device.

By implementation of this invention, it is possible to create a supply/demand operation schedule which improves system efficiency for the energy system overall. Further, by means of a method of this invention, even when characteristics of equipment existing in an energy system have complex non-linearity compared with the prior art, the characteristics can be handled comparatively easily. Also, what is originally a complex problem can be analyzed into partial problems which are comparatively simple and which can be solved independently, so that analysis of results obtained for each partial problem is comparatively easy, and hence the method is thought to enable easy explanation of solutions. From the standpoint of processing time, a method of this invention enables parallel computation, so that for example by applying a plurality of computers in parallel, processing can be made faster.

By means of this invention, in various energy systems which handle a plurality of types of energy, a method and device for operation scheduling for energy storage equipment can be provided, which determines optimal operation of an energy storage equipment and improves the efficiency of the energy system overall.

EXPLANATION OF REFERENCE NUMERALS

| | |
|---|---|
| 1 | Energy system operation scheduling device |
| 2 | Energy system |
| 11 | Energy demand forecast part |
| 12 | Energy generation equipment operation scheduling part |
| 13 | Energy storage equipment operation scheduling part |
| 14 | Energy supply unit-cost calculation part |
| 15 | Start/stop order calculation part |
| 16 | Energy generation equipment start/stop-dependent energy storage equipment operation scheduling part |
| 20 | Equipment controller |
| 21 | Energy generation equipment group |
| 22 | Energy storage equipment group |
| 23 | Energy load |
| 24 | Electric power load |
| 25 | Heat load |
| 31 | Control signal transmission medium |
| 32 | Energy transmission medium |
| 131 | Constraint setting part A |
| 132 | Nonlinear programming problem solving part A |
| 133 | Dynamic programming problem solving part |
| 135 | Constraint setting part B |

-continued

EXPLANATION OF REFERENCE NUMERALS

| | |
|---|---|
| 136 | Nonlinear programming problem solving part B |
| D1 | Energy demand forecast information |
| D2 | Energy generation equipment operation schedule |
| D3 | Equipment/facility database |
| D4 | Energy storage equipment operation schedule |
| D5 | Energy generation equipment modified operation schedule |
| D6 | Energy storage equipment modified operation schedule |
| D7 | Energy supply unit-cost |
| D8 | Start/stop order |
| D131 | Energy supply cost change information |

BEST MODE FOR CARRYING OUT THE INVENTION

This invention is generally applied to energy systems including cogeneration systems. In this case an energy system operation scheduling method is a method in which, based on a given power-heat demand for the energy system as a whole, start/stop plan (start/stop information for each equipment unit), forecast values of charged power quantities for electricity storage equipments, and forecast values of charged heat quantities for heat storage equipments, the output distribution values are calculated such that the energy supply costs of energy generation equipments are minimum over a plurality of time periods, and an operation schedule is created. Below, preferred embodiments to implement the invention are explained specifically, referring to FIG. 1 through FIG. 6. Throughout the figures, the same symbols are assigned to the same portions, and redundant explanations are omitted as appropriate.

1. First Embodiment

{1-1. Summary Configuration and Action}

Figure 1:
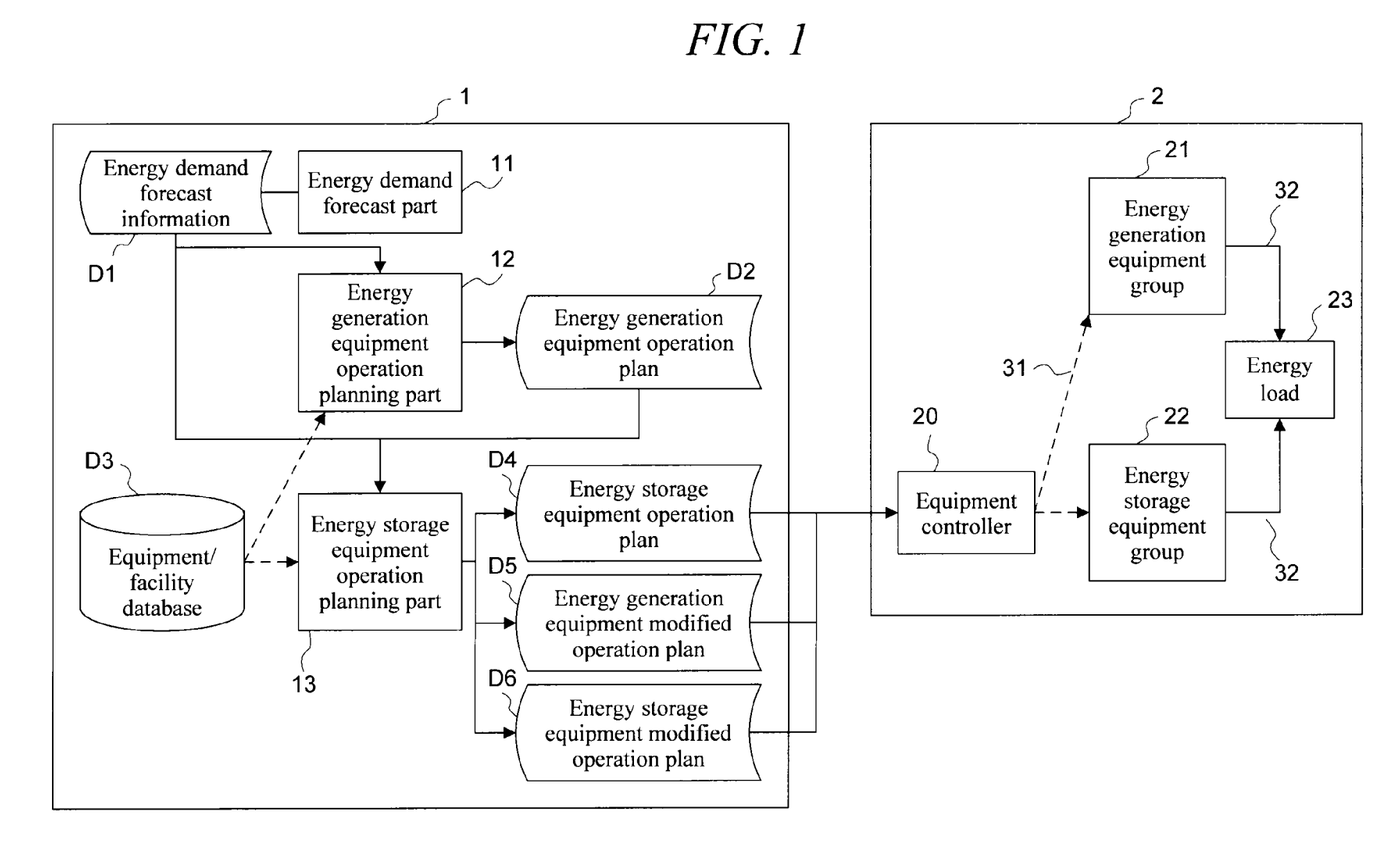
FIG. 1 is a block diagram showing the overall configuration of the energy system of a first embodiment of the invention.

FIG. 1 is a diagram of overall configuration, showing a first embodiment (hereafter in this section, "this embodiment") of the invention. More specifically, FIG. 1 is a block diagram showing the configuration connecting an energy system operation scheduling device 1 and an energy system 2, and the flow of energy and control information based thereupon.

To summarize, the energy system operation scheduling device 1 creates an energy storage equipment operation schedule D4, an energy generation equipment modified operation schedule D5, and an energy storage equipment modified operation schedule D6, and passes these to an equipment controller 20 of the energy generation system 2.

Upon receiving these schedules, the equipment controller 20 transmits information to control each of the equipment units to an energy generation equipment group 21 composed of power generation facilities and the like, and to an energy storage equipment group 22 composed of electricity storage equipments, heat storage equipments and the like, via a control signal transmission medium 31, based on the energy storage equipment operation schedule D4, the energy generation equipment modified operation schedule D5 and the energy storage equipment modified operation schedule D6. Energy is supplied to the energy load 23 from the energy generation equipment group 21 or the energy storage equipment group 22, via an energy transmission medium 32.

Inside this energy system operation scheduling device 1 there are provided an energy demand forecast part 11, an energy generation equipment operation scheduling part 12, and an energy storage equipment operation scheduling part 13.

The energy demand forecast part 11 is means for forecasting future energy demand, creating energy demand forecast information, and storing this in a storage part D1. The energy generation equipment operation scheduling part 12 is means for creating an energy generation equipment operation schedule, that is, start and stop information for each equipment unit, based on equipment/facility information stored in the equipment/facility database D3, and for storing this in a storage part D2. The methods for this forecasting of energy demand and for creation of an energy generation equipment operation schedule are similar to methods of the prior art.

A characteristic of this embodiment is the processing in the energy storage equipment operation scheduling part 13. This energy storage equipment operation scheduling part 13 creates an energy storage equipment operation schedule, an energy generation equipment modified operation schedule, and an energy storage equipment modified operation schedule, based on three information items, which are the energy demand forecast information stored in the storage part D1, the energy generation equipment operation schedule stored in the storage part D2, and equipment connection information, and sends [these schedules] to the equipment controller 20. Below, the configuration of this energy storage equipment operation scheduling part 13 is explained in detail.

{1-2. Specific Configuration and Action}

Figure 2:
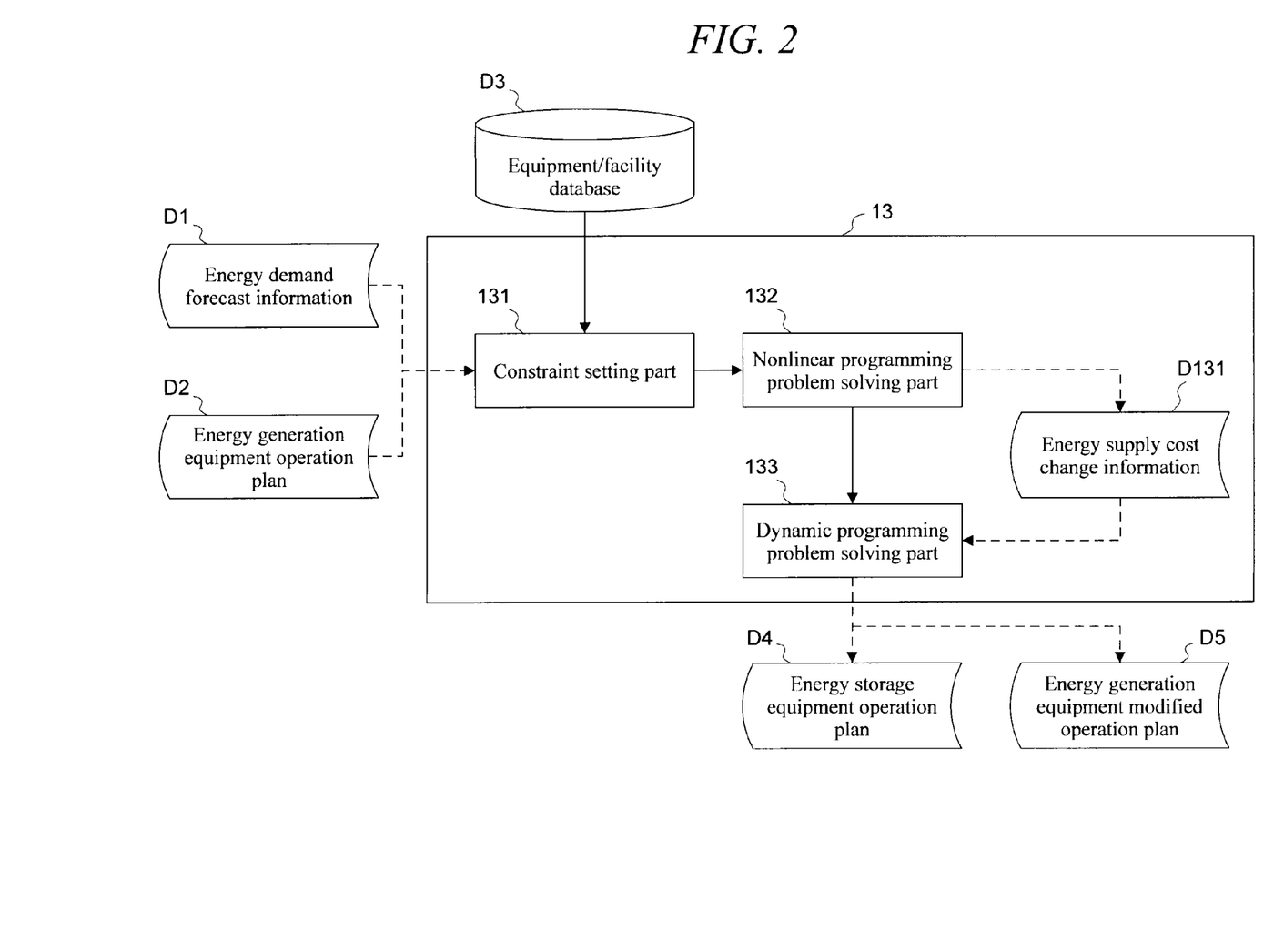
FIG. 2 is a block diagram showing a partial configuration of the energy system of the first embodiment of the invention.

Based on the above summary of this embodiment, the specific configuration of the energy storage equipment operation scheduling part 13 is explained, referring to the block diagram of FIG. 2. As shown in FIG. 2, the energy storage equipment operation scheduling part 13 comprises a constraint setting part 131, a nonlinear programming problem solving part 132, and a dynamic programming problem solving part 133.

The constraint setting part 131 receives three inputs, which are the energy demand forecast information stored in the storage part D1, the energy generation equipment operation schedule stored in the storage part D2, and the equipment/facility information stored in the equipment/facility database D3, and provides settings and conditions for the problem to the nonlinear programming problem solving part 132.

The nonlinear programming problem solving part 132 changes the loads to be allocated, by a given discrete quantity, either for a plurality of loads simultaneously or separately, for each of the combinations of discrete quantities (hereafter also called "storage quantity steps") in storage quantity changes of energy storage equipments obtained from the equipment/facility database D3. From these changes, the changes in energy supply costs are calculated and are stored in energy supply cost change information D131.

The dynamic programming problem solving part 133 uses values stored in the energy supply cost change information D131, and determines the optimum operation schedule for energy storage equipments, which is output to D4. At the same time, the modified optimum operation schedule for energy generation equipments is determined and so is output to D5.

Figure 3:
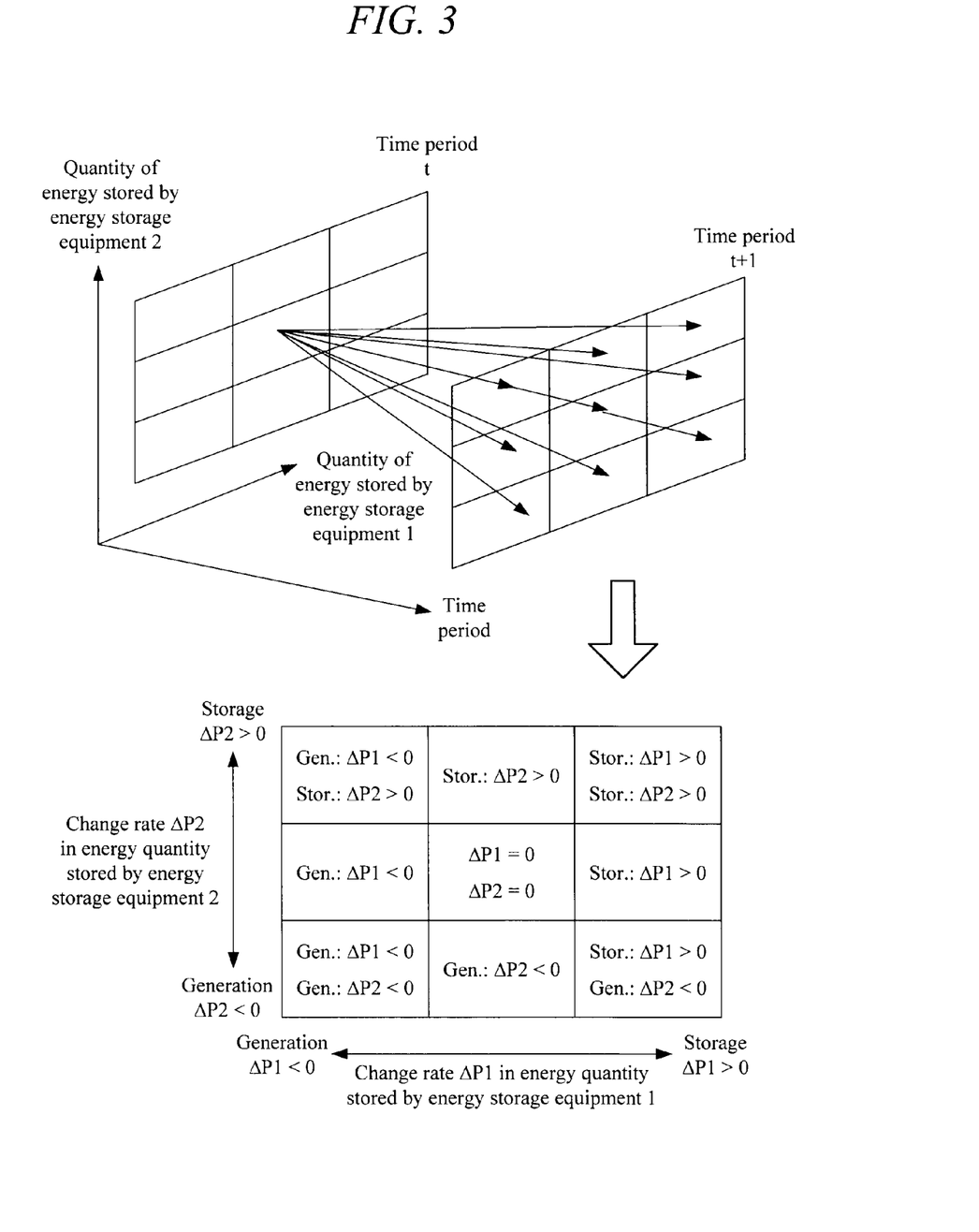
FIG. 3 is a conceptual diagram showing combinations of storage quantity steps of energy storage equipments in the first embodiment of the invention.

First, processing of the nonlinear programming problem solving part 132 is explained. The nonlinear programming problem solving part 132 finds a solution to the following optimization problem for a combination of storage quantity steps of energy storage equipments. FIG. 3 is a conceptual diagram showing a combination of storage quantity steps of two energy storage equipments. For each of the mesh-shape combinations shown in the figure, changes in the energy supply cost are found using the following equation.

Objective function (Eq. 1)

$$\sum_{i=1}^{N} f(v_{i,t})u_{i,t} \to \min \quad \text{(energy supply cost minimization)}$$

Constraints:

Start/stop state of energy generation equipment is given by $u_{i,t}$.

$$u_{i,t} \cdot \underline{v}_{i,t} \leq v_{i,t} \leq u_{i,t} \cdot \overline{v}_{i,t} \quad (\forall i) \quad \text{(load factor constraint)}$$

$$\sum_{i=1}^{N} u_{i,t} P_{i,s}(v_{i,t}) = DP_{s,t} + \Delta DP_{s,j(s)} \quad (\forall t) \quad \text{(energy balance constaint)}$$

$$\Delta DP_{s,j(s)} = \begin{cases} \Delta P_{s,j(s)} & \text{(generation when } \Delta P_{s,j} < 0) \\ \Delta P_{s,j(s)}/\eta_s & \text{(storage: when } \Delta P_{s,j} > 0) \end{cases}$$

Here,
t: Time period subscript
i: Energy generation equipment subscript
s: Energy storage equipment subscript (also an energy type subscript)
N: Number of energy generation equipments in the energy system
S: Number of energy storage equipments in the energy system
$f_i$: Energy supply cost characteristic for the load factor of energy generation equipment
$V_{i,t}$: Load factor in time period t of energy generation equipment i
$P_{i,s}$: Output characteristic of energy type s of energy generation equipment i
j(s) Storage quantity change step of energy storage equipment s
$\Delta DP_{s,j(s)}$: Energy storage quantity change of storage quantity change step j(s) of energy storage equipment s
$\eta_s$: Storage efficiency of energy storage equipment s In equation (1), the energy balance constraint was expressed as an equality, but a case which includes an inequality constraint can be handled similarly.

By for example applying a sequential quadratic programming method to a continuous-type nonlinear problem as in equation (1) above, a solution can be obtained. A sequential quadratic programming method is a method in which, in each iteration, a quadratic programming problem approximating the original problem is solved sequentially; details are for example described in Non-patent Document 1, and so are here omitted. By means of this method, energy supply cost characteristics are not limited to quadratic characteristics.

Next, the dynamic programming problem solving part 133 is described.

Hereafter, energy storage quantities of all energy storage equipments are expressed using the following vector. This vector can also be called the energy storage state.

$$V_{t,s,m}$$

Here t, s, m are subscripts representing the following quantities.
t: Time period
s: Energy storage equipment number
m: Storage quantity step The change in the energy storage state of all energy storage equipments from time period t−1 to time period t is expressed by the following vector:

$$\Delta DP_{t,s,m,1} = V_{t,s,m} - V_{t-1,s,1}$$

In order to secure a balance of energy supply and demand for the energy system overall, this change quantity is reflected in the energy generated by other energy generation equipments. Hence by substituting this vector value into equation (1) and finding a solution to the nonlinear programming problem, the change in cost of energy supply by the energy generation equipments, which is expressed by the following from the energy storage quantity $V_{t-1,s,1}$ to the energy storage quantity $V_{t,s,m}$, can be calculated. This change in cost of energy supply is expressed by the following value:

$$\Delta C(V_{t-1,s,1}, V_{t,s,m})$$

In actuality, what is used as this value is the value stored in the energy supply cost change information D131. When considering sequential transitions in the energy storage state, the pathway connecting two energy storage states is here called a path.

When the path is determined in which the energy supply cost change quantity up to an energy storage quantity $V_{t-1,s,1}$ in time period t−1 is minimum, and when the energy supply cost change sum $\phi(V_{t-1,s,1})$ of energy generation equipments is determined which is up to the time period t−1 until arriving at this energy storage state $V_{t-1,s,1}$ at this time, the optimum path to arrive at the energy storage quantity in the next time period t can be calculated using equation (2) below.

$$\varphi(V_{t,s,m}) = \min_l [\varphi(V_{t-1,s,l}) + \Delta C(V_{t-1,s,l}, V_{t,s,m})] \quad \text{(Eq. 2)}$$

Normally, the start and end point conditions of the energy storage quantity, and the capacity upper and lower limits are also given.

$V_{0,s}$(given), $V_{T,s}$(given)

$$\underline{V_{t,s}} \leq V_{t,s} \leq \overline{V_{t,s}} (t=1, \ldots, T)$$

$\underline{V_{t,s}}$: Capacity lower limit of energy storage equipment s in time period t $\overline{V_{t,s}}$: Capacity upper limit of energy storage equipment s in time period t By sequentially executing this calculation from the initial time period to the final time period, the energy supply cost change in the final time period can be calculated. Here, the path in which the energy supply cost change is minimum (that is, in which the energy supply cost reduction effect of the energy generation equipments is maximum) can be selected, and this path is, in other words, the optimum operation schedule for the energy storage equipments.

{1-3. Advantageous Results}

By means of this embodiment, a supply/demand operation schedule which improves system efficiency for the energy system overall can be created. Further, by means of the method of this embodiment, even when equipment existing in the energy system has a complex nonlinear characteristic compared with the prior art, the characteristic can be handled comparatively easily. Further, what is originally a complex problem can be analyzed into partial problems which are comparatively simple and which can be solved independently, so that analysis of results obtained for each partial problem is comparatively easy, and hence the method is thought to enable easy explanation of solutions. From the standpoint of processing time, the method of this embodiment enables parallel computation, so that for example by applying a plurality of computers in parallel to the method, processing can be made faster.

By means of this embodiment as described above, output distribution values to minimize the energy supply cost of energy generation equipments over a plurality of time periods can be calculated, according to a given demand forecast information for the energy system overall and the operation schedule (start/stop information for each equipment unit) of the energy generation equipments. By this means, optimum operation for energy storage equipments in various energy systems which handle a plurality of types of energy can be found, and efficiency of the energy system overall can be improved.

2. Second Embodiment

Figure 4:
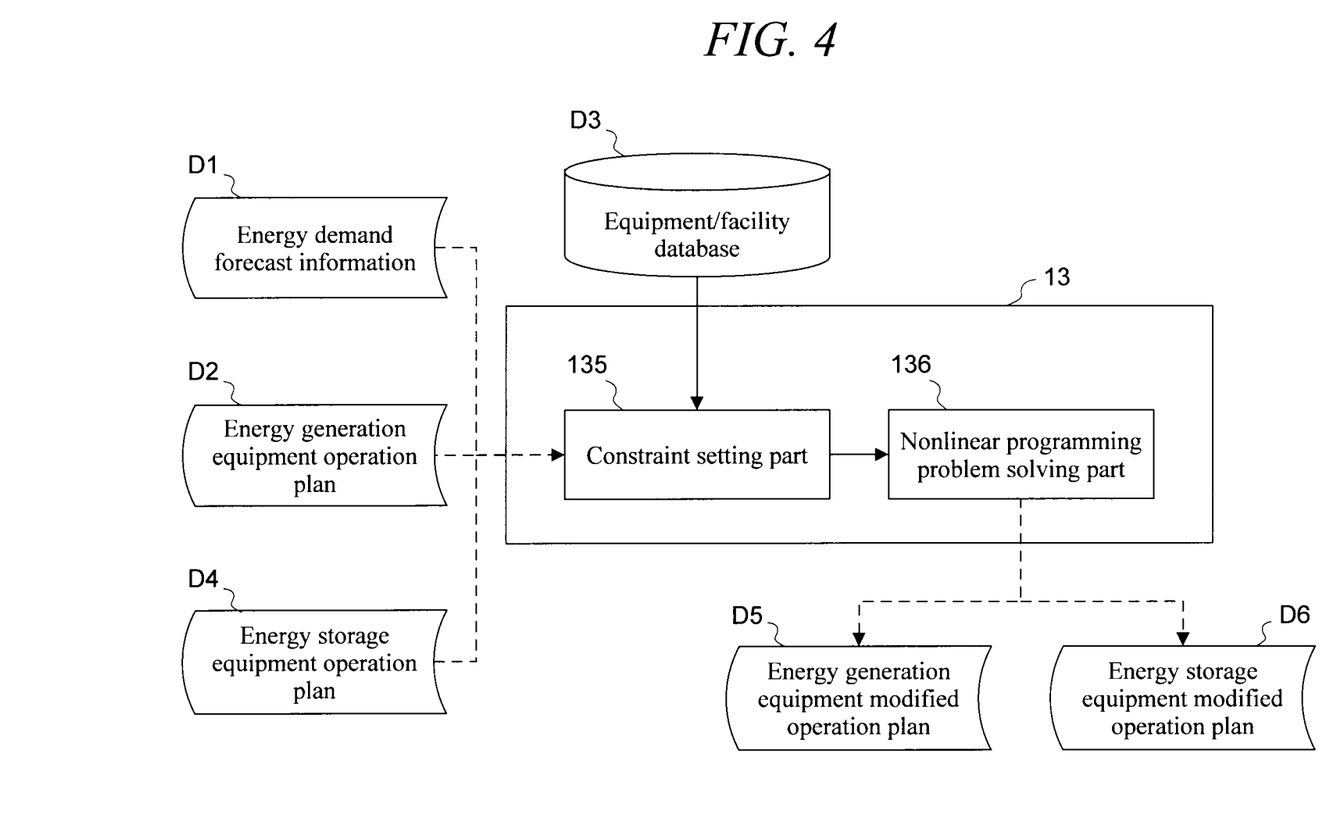
FIG. 4 is a block diagram showing a partial configuration of the energy system of a second embodiment of the invention.

Next, a second embodiment (hereafter in this section, "this embodiment") is explained, using the block diagram of FIG. 4. This embodiment adds an improvement to the specific configuration of the energy storage equipment operation scheduling part 13 of the first embodiment. Otherwise the configuration is similar to that of the first embodiment, and so an explanation is omitted.

In FIG. 4, the constraint setting part 131 receives three inputs, which are the energy demand forecast information stored in the storage part D1, the energy generation equipment operation schedule stored in the storage part D2, and the equipment/facility information stored in the equipment/facility database D3, and provides problem settings and conditions to nonlinear programming problem solving part 136.

The nonlinear programming problem solving part 136 obtains storage quantity step values of energy storage equipments as an energy storage equipment operation schedule D4. These step values are used as a constraint condition to calculate the optimum distribution for energy generation equipments and energy storage equipments, and an energy generation equipment modified operation schedule is output to a storage part D5, and a energy storage equipment modified operation schedule is output to a storage part D6.

Figure 5:
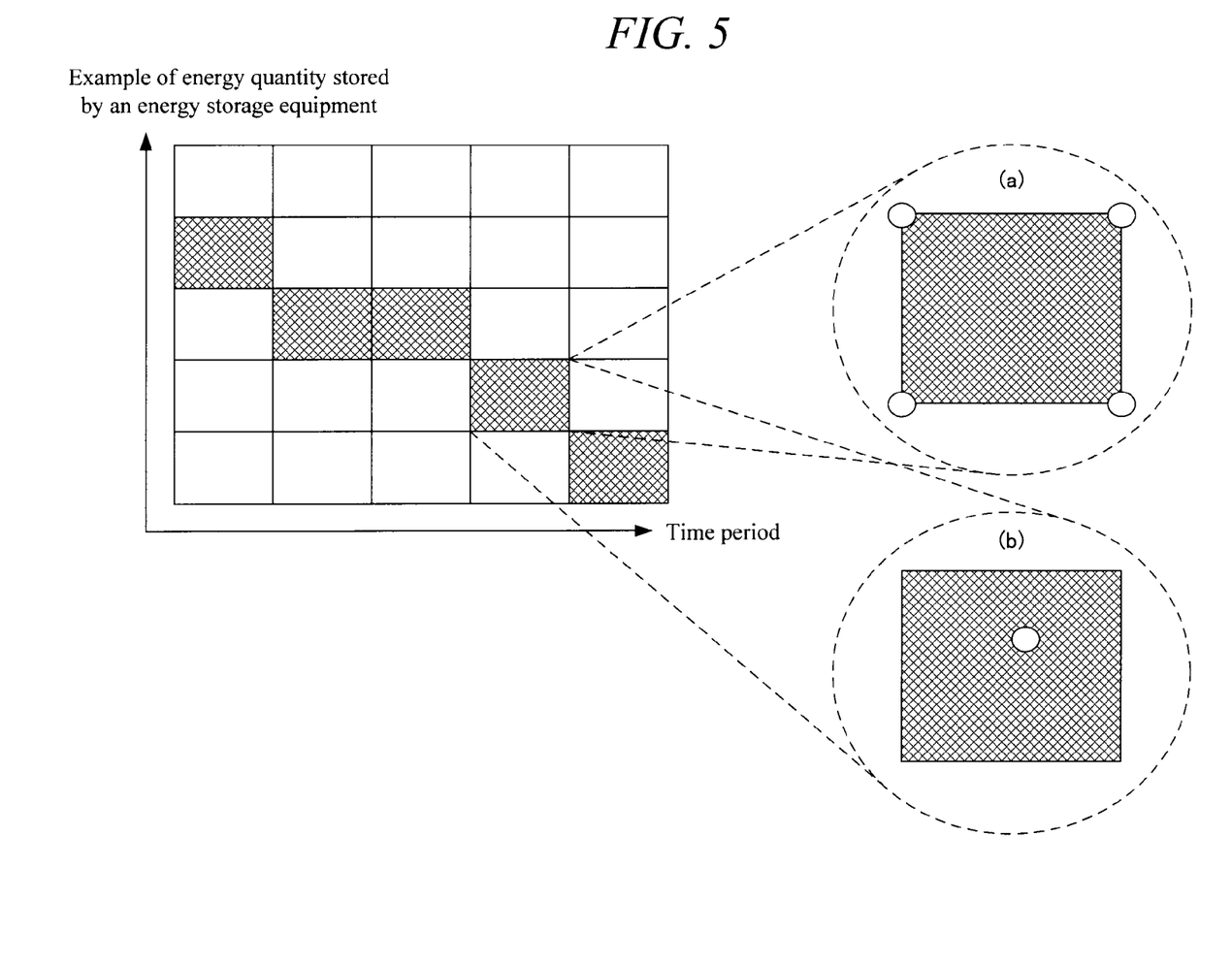
FIG. 5 is a conceptual diagram showing differences between the solution in the first embodiment of the invention and the solution of the second embodiment.

The nonlinear problem solving part 135 finds a solution to the following optimization problem. Here, an energy storage quantity step constraint represents the constraint that an energy storage quantity be within the range of storage quantity step values of energy storage equipments, determined from an energy storage equipment operation schedule stored in the storage part D4. FIG. 5 shows the difference between a discrete solution found in the first embodiment above, and a continuous-value solution found in this embodiment. That is, as shown in (a) of FIG. 5, the solution found by the method of the first embodiment is the grid points of a mesh. And, as shown in (b) of FIG. 5, the method of this embodiment solves the following optimization problem under the conditions that values can be found within an arbitrary range in a mesh.

Objective function (Eq. 3)

$$\sum_{i=1}^{N} f(v_{i,t}) u_{i,t} \to \min \quad \text{(energy supply cost minimization)}$$

-continued

Constraints:

$u_{i,t} \cdot \underline{v}_{i,t} \leq v_{i,t} \leq u_{i,t} \cdot \overline{v}_{i,t}$ ($\forall i$)   (load factor constraint)

$\Delta DP_{s,t,j1} \leq \Delta DP_{s,t} \leq \Delta DP_{s,t,j2}$ ($\forall s, \forall t$)   (energy storage quantity step constraint)

$\sum_{i=1}^{N} u_{i,t} P_{i,s}(v_{i,t}) = DP_{s,t} + \Delta DP_{s,t}$ ($\forall t$)   (energy balance constraint)

$\sum_{t=1}^{T} \Delta DP_{s,t} = 0$ ($\forall s$)   (energy storage equipment start/end point constraint)

Here,
T: Calculation term

By means of the above-described second embodiment, solutions can be obtained with still higher precision than using the method of the first embodiment.

3. Third Embodiment

Figure 6:
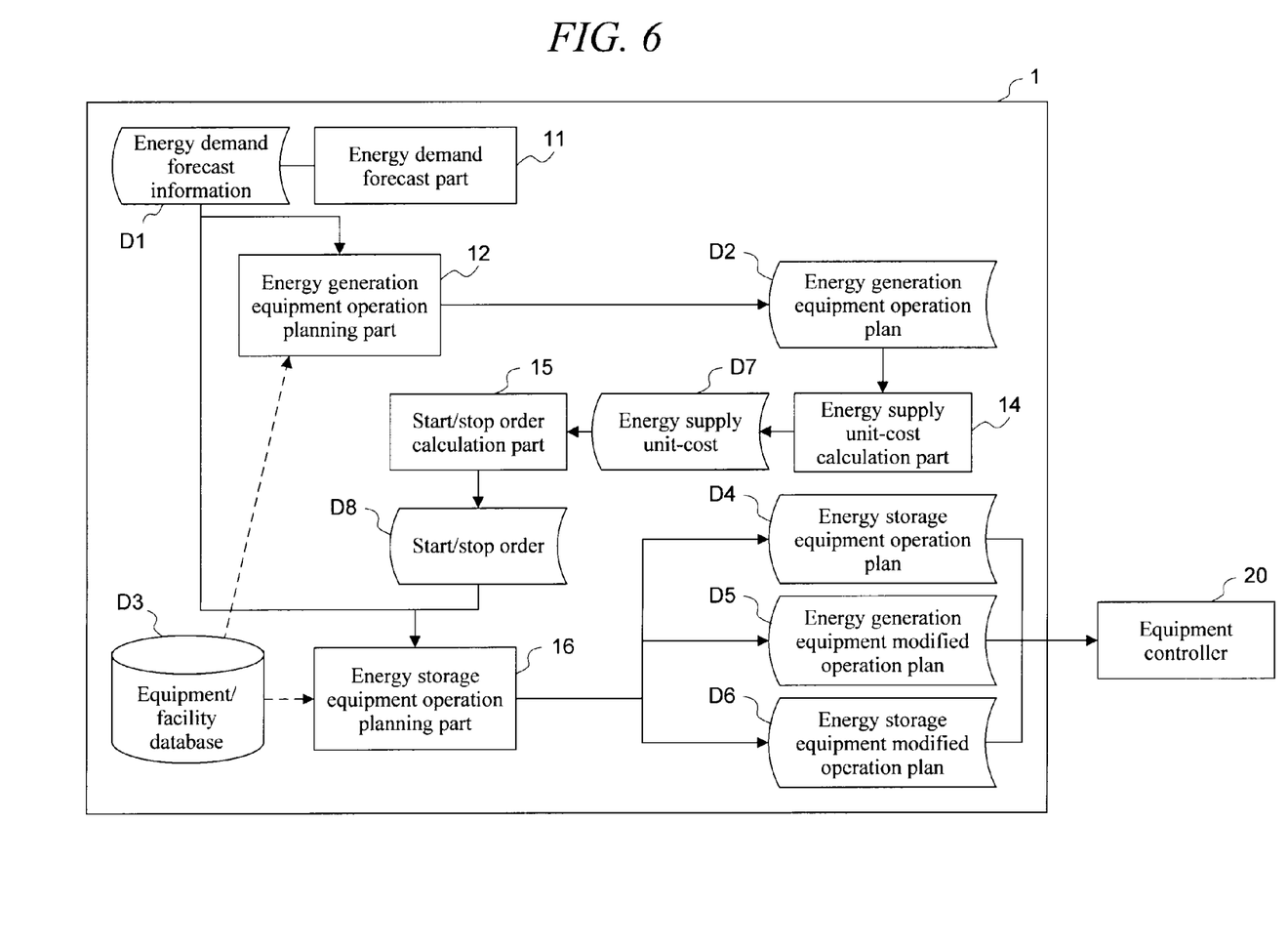
FIG. 6 is a block diagram showing the overall configuration of the energy system of a third embodiment of the invention.

Next, a third embodiment (hereafter in this section, "this embodiment") is explained, using the block diagram of FIG. 6. This embodiment uses, in place of the energy storage equipment operation scheduling part 13 of the first embodiment, energy supply unit-cost calculation part 14, start/stop order calculation part 15, and energy generation equipment start/stop-dependent energy storage equipment operation scheduling part 16. Otherwise this configuration is similar to that of the first embodiment, and so an explanation is omitted.

The energy supply unit-cost calculation part 14 calculates the energy supply unit-cost, and stores this in a storage part D7. The start/stop order calculation part 15 creates a start/stop order based on input of this energy supply unit-cost, and stores the result in a storage part D8.

The energy generation equipment start/stop-dependent energy storage equipment operation scheduling part 16 creates an energy storage equipment operation schedule D4, energy generation equipment modified operation schedule D5, and energy storage equipment modified operation schedule D6.

The operation unit-cost calculated by the energy unit-cost calculation part 14 is for example calculated using the following equation (4).

$$\text{Operation unit-cost}_{i,t} = \begin{cases} f_i(v_{i,t}) / \sum_s P_{i,s}(v_{i,t}) & \text{for } u_{i,t} = 1 \\ 0 & \text{for } u_{i,t} = 0 \end{cases} \quad \text{(Eq. 4)}$$

The larger this value for an energy generation equipment, the poorer the efficiency of operation is thought to be, and so the equipment is a candidate for stoppage. Conversely, a startup candidate is an energy generation equipment for which the value of equation (4) at the maximum load factor is small, for example.

Hence the start/stop order calculation part 15 sorts the energy generation equipments in the order of the magnitude of this value. The energy generation equipment start/stop-dependent energy storage equipment operation scheduling part 16 evaluates equation (1) under conditions of motor stoppage in the order of the start/stop order D8, and subsequently, similarly to the procedure described in the first embodiment, creates an energy storage equipment operation schedule D4, energy generation equipment modified operation schedule D5, and energy storage equipment modified operation schedule D6.

By means of the third embodiment as described above, from an initially given energy generation equipment operation schedule, a lower-cost energy generation equipment operation schedule and an energy storage equipment operation schedule can be created.

The invention claimed is:

1. A method for operation scheduling for energy storage equipment in an energy system which has an energy generation equipment group composed of a plurality of energy generation devices and an energy storage equipment group composed of a plurality of energy storage devices capable of both energy generation and storage, the method comprising the steps of:

forecasting energy demand for the energy system overall in each time period included in a prescribed term;

finding an operation schedule of the energy generation devices such that an operation schedule for each time period is found which satisfy energy demand for a prescribed term in each of the energy generation devices;

changing loads to be allocated to each of the energy generation devices, by a given discrete quantity, either for a plurality of loads simultaneously or separately, and calculating the change in energy supply cost from this change of the loads; and, determining an operation schedule of the energy storage devices, based on the forecasted energy demand and the operation schedule, such that the sum of the energy supply costs of the energy generation devices during the term is minimized, wherein the step of determining the operation schedule of the energy storage devices occurs under the conditions that values are found within a mesh defined by a range of discrete quantities in the change of energy quantity stored by each of the energy storage devices such that the sum of the energy supply costs of the energy generation devices during the prescribed term is minimized.

2. The method for operation scheduling for energy storage equipment according to claim 1, the method further comprising the steps of:

calculating an energy supply unit-cost calculation part in arbitrary time period of an arbitrary energy generation equipment; and changing a state to start or stop in arbitrary time period of an arbitrary energy generation equipment in accordance with a given operation schedule of the energy generation devices.

3. A device for operation scheduling for energy storage equipment in an energy system which has an energy generation equipment group composed of a plurality of energy generation devices and an energy storage equipment group composed of a plurality of energy storage devices capable of both energy generation and storage, the device comprising:

an energy demand forecast part which forecasts energy demand for the energy system overall in each time period included in a prescribed term;

an energy generation equipment operation scheduling part which finds an operation schedule of the energy generation devices such that an operation schedule for each time period is found which satisfy energy demand for a prescribed term in each of the energy generation devices;

a nonlinear problem solving part which changes the loads to be allocated to each of the energy generation devices, by a given discrete quantity, either for a plurality of loads simultaneously or separately, and calculates the change in energy supply cost from this change of the loads; and an energy storage equipment operation scheduling part which determines an operation schedule of the energy storage devices, based on the forecasted energy demand and the operation schedule, such that the sum of the energy supply costs of the energy generation devices during the term is minimized, wherein the energy storage equipment operation scheduling part determines the operation schedule of the energy storage devices under the conditions that values are found within a mesh defined by a range of discrete quantities in the change of energy quantity stored by each of the energy storage devices such that the sum of the energy supply costs of the energy generation devices during the prescribed term is minimized.

* * * * *